Figure 1:
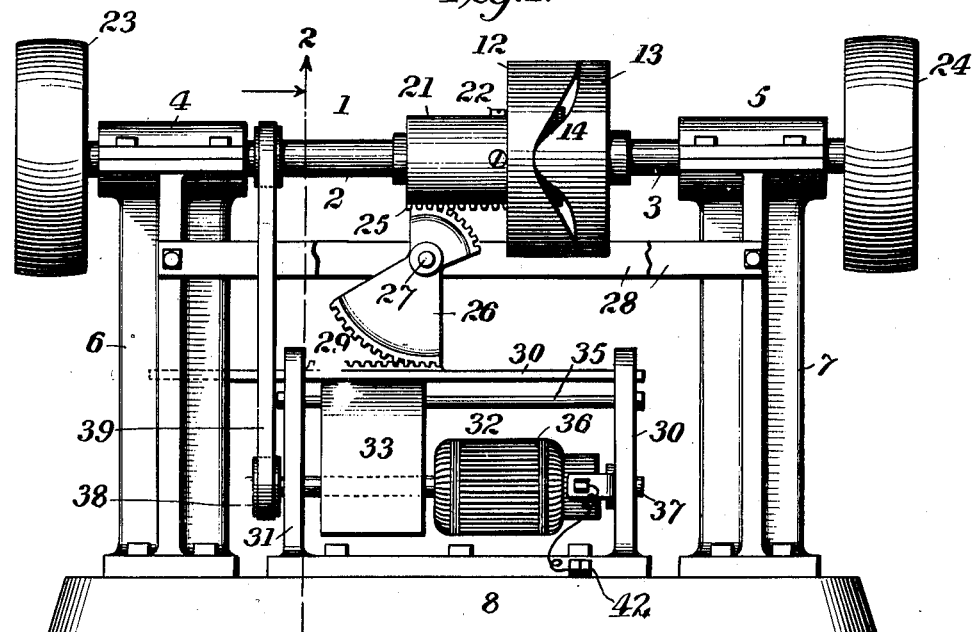

No. 891,018. PATENTED JUNE 16, 1908.
C. E. VAWTER, Jr.
POWER METER.
APPLICATION FILED NOV. 6, 1907.

2 SHEETS—SHEET 1.

Witnesses
J. G. Stinkel
Wm. Chadwick

Inventor
C. E. Vawter Jr.
By John H. Holt
his Attorney

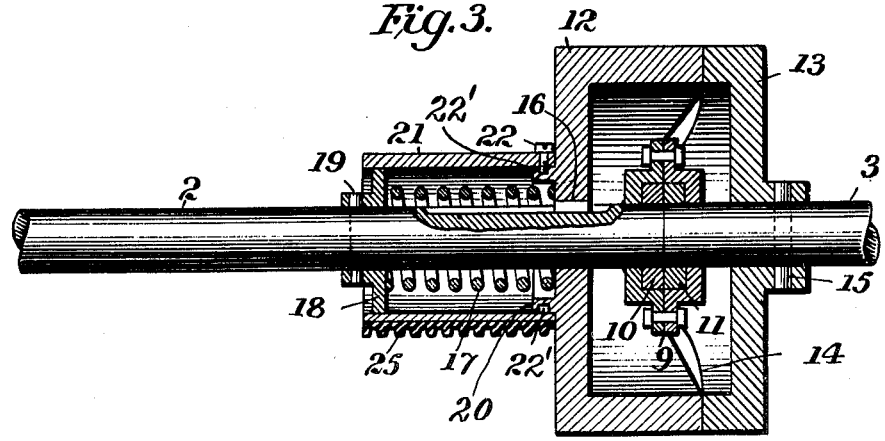
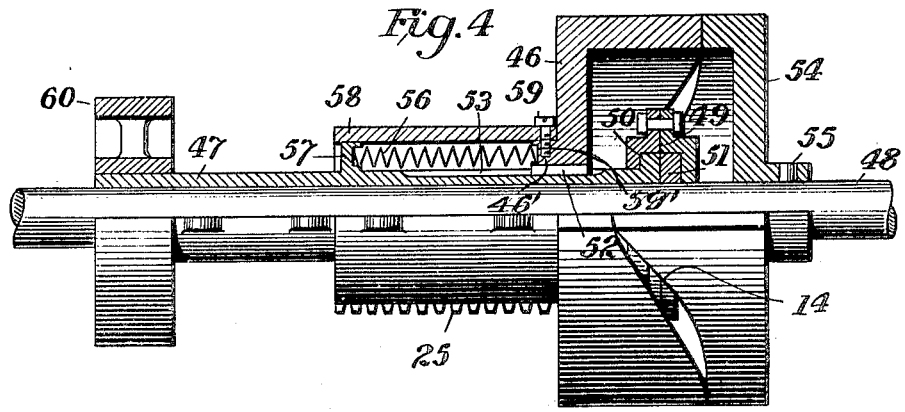
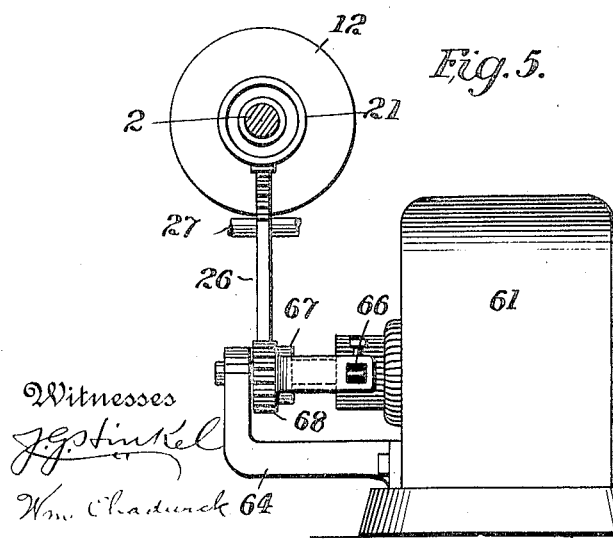
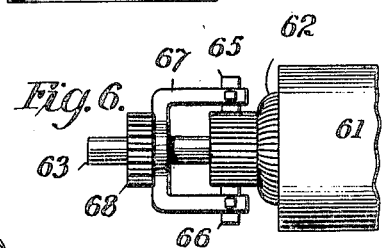
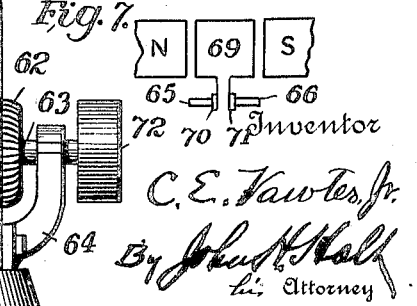

UNITED STATES PATENT OFFICE.

CHARLES E. VAWTER, JR., OF BLACKSBURG, VIRGINIA.

POWER-METER.

No. 891,018.          Specification of Letters Patent.          Patented June 16, 1908.

Application filed November 6, 1907. Serial No. 400,930.

*To all whom it may concern:*

Be it known that I, CHARLES E. VAWTER, Jr., a citizen of the United States, residing at Blacksburg, in the county of Montgomery and State of Virginia, have invented certain new and useful Improvements in Power-Meters, of which the following is a specification.

The primary object of this invention is the production of direct reading apparatus for the measurement of the driving power of any rotating shaft or other prime mover.

The so-called power meters and power scales hitherto known in the art measure simply the torque, and not the real power, which latter is the product of the torque multiplied by the angular velocity.

The apparatus embodying this invention measures the real power and indicates this directly, without the necessity of any mathematical calculations on the part of the user. This is accomplished in the present invention by causing the voltage of a dynamo electric machine to vary directly as said power varies, by making the effective magnetic flux through the armature of said dynamo vary directly as the torque along the shaft whose power is to be measured varies; causing the revolutions per second of said armature to vary directly as the angular velocity of said shaft varies, and connecting to the brush terminals of said dynamo a volt meter with a converted cable calibrated to read in horse power or other power quantities.

The speed of the dynamo armature may be made to vary directly as the angular velocity of the shaft, the power of which is to be measured by simply belting or gearing the armature shaft to the power shaft either directly or indirectly.

For causing the effective magnetic flux through the armature to vary directly as the torque of the power shaft, I have shown herein two arrangements: One consists in making the field magnet and armature relatively movable laterally and varying this relative movement by means of a transmission dynamometer operatively connected to one of the said elements of the dynamo to move the same relative to the other element in such manner as to vary the effective field strength directly as torque is transmitted by the shaft. The other arrangement consists in causing the transmission dynamometer to shift the brushes on the commutator of the dynamo and thereby vary the effective magnetic flux directly as the torque transmitted by said shaft.

My invention consists further in the novel combination and arrangement of parts hereinafter described and more particularly pointed out in the accompanying claims.

Figure 2:
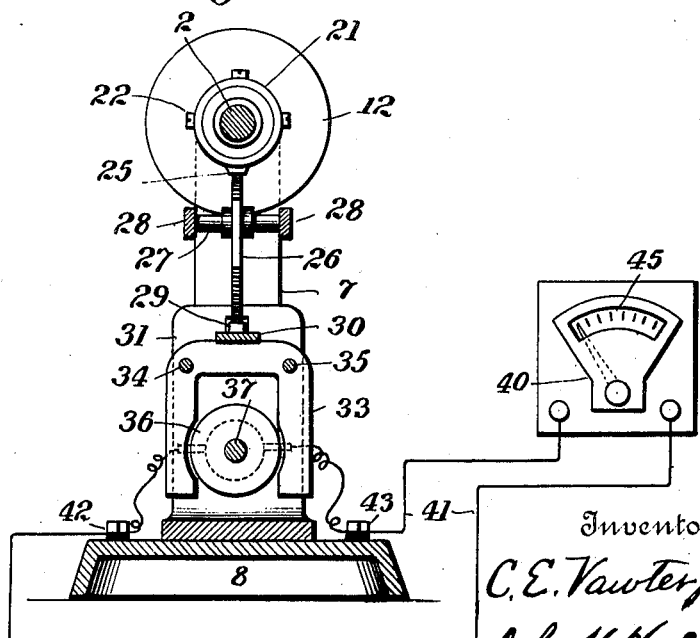

In order to more fully describe my invention reference will be had to the accompanying drawings forming a part of this specification, wherein:

Figure 1, is a side elevation of one form of apparatus, embodying my said invention; Fig. 2, a section taken on line 2—2, Fig. 1, looking in the direction of the arrow, and showing in diagram the electrical connections; Fig. 3, a detail central vertical longitudinal sectional view of parts of the torque transmission dynamometer shown in Figs. 1 and 2; Fig. 4, a view partly in central vertical longitudinal section and partly in elevation of a modification of the torque transmission dynamometer shown in the preceding figures; Fig. 5, a view partly in end elevation and fragmentary section of another form of apparatus embodying my said invention; Fig. 6, a fragmentary detail top plan view of the electric generator shown in Fig. 5, and Fig. 7, a diagram to illustrate the principle of the apparatus shown in Figs. 5 and 6.

Referring first to the form of my invention shown in Figs. 1 to 3 inclusive, 1 represents a shaft transmission dynamometer, comprising two abutting shafts 2 and 3 journaled in alinement in suitable bearings 4 and 5 supported by pillars 6 and 7 respectively mounted on a suitable base 8. These shafts are free to rotate relatively to each other, but are prevented from relative lateral movement by a split collar 9, which incloses rings or flanges 10 and 11 on the abutting ends of said shafts. See Fig. 3. These rings may be shrunk on said shafts, integral therewith or made fast thereto in any other desired way. On these shafts are mounted two cam clutch members 12 and 13 respectively, the cam faces 14 of which normally interlock as shown. The member 13 is made fast on shaft 3, as to relative movement both longitudinally and angularly, by pin 15; while member 12 is free to move longitudinally of shaft 2, but is held against rotation relative thereto by means of key 16.

A spiral spring 17 surrounds the shaft 2 and is normally under compression between the member 12 and a flanged collar 18 made fast on the shaft 2 as by pin 19.

An annular flange 20 on the member 12 forms a chamber for one end of the spring 17 and also a support for one end of a sleeve 21 which fits over the outside thereof and is made fast thereto against longitudinal movement with respect to the cam member 12 by one or more bolts 22 which extend into an annular slot or groove 22' in the flange 20. By this arrangement there may be relative angular movement between the member 12 and the sleeve 21, but not relative longitudinal movement. The other end of the sleeve 21 receives the collar 18 upon which it is adapted to slide.

Pulleys 23 and 24 are mounted on the shafts 2 and 3 respectively for the purpose of connecting said shafts to the source of power and the driven shaft respectively, or vice versa, or the dynamometer may be placed directly on shaft whose power is to be measured. It will therefore be seen that as long as the shaft 3 offers no appreciable resistance to the rotation of shaft 2, power will be transmitted from shaft 2 to shaft 3 through the clutch members 12 and 13 without any relative angular displacement between said members. When, however, there is a load on shaft 3, this will cause a relative angular displacement between the members 12 and 13 which will vary as the torque along said shafts varies. Since the abutting faces of the members 12 and 13 are cams this angular displacement between said members will cause them to separate, the member 12 traveling longitudinally of the shaft 2 against the tension of the coil spring 17, to the left, Figs. 1 and 3. The member 13 cannot move longitudinally of shaft 3 because it is held by pin 15. The movement of the member 12 transmits a lateral movement to the sleeve 21, which movement varies directly as the torque, transmitted along said shafts varies, or by any desired law depending upon shape of cams, 12 and 13. Angular movement of the sleeve 21 around shaft 2 may be prevented either by the friction between rack 25 and gear 26 or in any other suitable way.

A rack 25 is made fast to the bottom of the sleeve 17 and meshes with one side of a double sector gear 26 suitably mounted on a spindle 27 carried in supporting bars 28 made fast to the bearing pillars 6 and 7. The other side of this sector gear meshes with a rack 29 mounted to travel laterally in suitable uprights 30 and 31 which form a part of the frame work of a dynamo electric machine. This dynamo is provided with a magnet 32, having a permanent field, and this magnet is operatively connected to the rack 28 for movement thereby, as shown, or in any other desired way, and is mounted to travel on suitably supported guide rods 34 and 35, which may pass loosely therethrough. The armature 36 of the dynamo may be of any desired type, but is normally so disposed relative to the field magnet 33 that the effective magnetic flux therethrough shall be preferably zero. This is effected in the case shown, in Figs. 1 and 2, by mounting the armature on a long shaft 37, so that the armature proper shall be wholly outside of the field of the magnet 33. It will therefore be seen that as the sleeve 21 slides longitudinally of shaft 2 directly in proportion as the torque transmitted along that shaft varies, this movement may be utilized to vary the effective magnetic flux through the armature 36. The maximum lateral movement transmitted by the cams of members 12 and 13 is sufficient to shift the magnet of the dynamo far enough to the right to cause the effective magnetic flux through the armature to be a maximum, and between this position and that of minimum flux shown, the said flux will vary directly in proportion to the lateral shifting of the sleeve 21 or the torque along shaft 2. When desired to avoid a zero error, magnet 33 may be moved proportionately farther at starting by properly shaping cams 12 and 13. It is also necessary that the revolutions per second of the armature shall vary directly as the angular velocity of the shaft the power of which is being measured. I effect this in the apparatus shown in Figs. 1 to 3 by merely belting a pulley 38, on the armature shaft, to shaft 2, as by means of belt 39. Any other suitable means, however, may be employed for effecting this connection.

The electrical connections are shown in Fig. 2, where 40 represents a Weston standard direct current voltmeter or other voltmeter provided with a converted scale and connected across "open" circuit 41 leading from the brush binding posts 42, 43 of the dynamo armature 36 which is preferably of the open coil type.

If the voltmeter is electrostatic, then the circuit 41 will be actually open; but in case a voltmeter such for example as the Weston D. C. type is used, the voltmeter's resistance is made so high as to make the effects in the dynamo armature due to current practically negligible; that is, substantially the same as if the entire external circuit of the armature were actually open. The E I loss in armature and reaction of same on field when on closed circuit will make errors which the "open" circuit will not give.

The scale 45 of the instrument 40 may be calibrated in horse power in any suitable way.

In Fig. 4, I have shown the transmission dynamometer in a form especially adapted to be mounted directly on the shaft, the power of which is to be measured. In this form of the dynamometer the power is transmitted to the laterally movable cam clutch member 46 through a sleeve 47 mounted on shaft 48 whose power is to be measured. This sleeve is rotatable on shaft 48, but is held from longitudinal movement thereon by means of split collar 49 which incloses a flange 50 on the end of said sleeve and a ring 51 made fast on shaft 48. The cam member is held from rotation on sleeve 47 by means of key 52 which is adapted to slide longitudinally in way 53, thereby permitting member 46 to move longitudinally on the shaft by contact with cam member 54. The latter member is made fast on the shaft 48 by pin 55 against both rotation on said shaft and movement longitudinally thereof. In this form of the dynamometer the single coil spring 17 surrounding the shaft in the first described form is replaced by spiral springs 56, one only of which is shown, placed around the outside of the sleeve 47 and held normally under compression between the member 46 on a flange 57 formed on the sleeve 47. These springs are inclosed by a sleeve 58 made fast to the member 46 against longitudinal movement relative to member 46 by screws 59 which extends into an annular slot or groove 59' on flange 46'. The member 46 is slidable on the periphery of the flange 57. Power to drive the dynamometer may be applied at pulley 60 mounted on sleeve 47. In this form of the dynamometer, the said pulley, sleeve 47, sleeve 58, and clutch members 46 and 54 are all preferably in split sections, as shown to permit them to be readily placed upon a shaft.

In Figs. 5, 6, and 7 I have shown a form of my invention in which the effective magnetic flux through the dynamo armature is varied directly with the torque of the power shaft by shifting the brushes of the dynamo. In this form of apparatus the dynamo has a stationary permanent bipolar magnet 61, and a drum-wound upon open coil armature 62, the shaft 63 of which is journaled in suitable brackets 64. The brushes 65 and 66 are mounted in an adjustable brush holder 67 loosely mounted on the armature shaft and made fast to a pinion 68 which is also loosely mounted on the armature shaft. This pinion is geared to the lower teeth of the sector 26, so that as the transmission dynamometer shifts, said sector will in turn rotate the pinion 68 and this being connected to the brush holder 67 will shift the brushes 65, 66, thereby varying the effective magnetic flux through the dynamo armature.

The operation by which the effective magnetic flux through the dynamo armature is varied by shifting the brushes will be clear from the diagram Fig. 7, where 69 represents one of the open coil armature windings each of which terminates in two commutator segments 70 and 71, located on diametrically opposite sides of the commutator. When the brushes 65 and 66 are in the position shown, the number of lines of force cut by the armature winding will be a maximum, and when shifted 90°, the magnetic flux through said winding will be zero when the commutator segments come in contact with said brushes. Hence by shifting the brushes through an arc of 90° the effective magnetic flux through the armature may be varied all the way from a maximum to zero. For this purpose the commutator segments should be narrow, and the brushes should contact with only a small portion of the commutator, thereby throwing each coil in for only a short time and through a very small arc. The number of commutator segments and the number of armature coils should be large in order to give a uniform E. M. F. for a given position of the brushes. Also, the pole pieces of the permanent field magnet of the dynamo should be so shaped as to give a field in which the number of magnetic lines of force cut by the active coil will vary directly as the angle through which the brushes are rotated.

The armature shaft 63 may be driven through pulley 72 or otherwise geared to run at a speed which shall vary directly as the angular velocity of the shaft whose power is to be measured, varies.

The forms of transmission dynamometer which I have herein shown are good, but I do not wish to be understood as limiting my invention to any specific form of transmission dynamometer or in fact to any one specific way of varying the effective magnetic flux through the armature of the dynamo except where either of these may be specifically claimed. I may also make other modifications and changes as to the construction of the apparatus without departing from the spirit of my invention.

Having thus described my invention what I claim is:—

1. In apparatus of the character described, the combination with a rotatable shaft, of a dynamo electric machine adapted to have the effective magnetic flux through its armature varied, operative connection between said shaft and a part of said dynamo adapted to vary the effective magnetic flux through the armature of said dynamo directly as the torque transmitted along said shaft varies, means to vary the speed of rotation of the rotating element of said dynamo directly as the angular velocity of said shaft varies, and a voltage operated measuring instrument connected in circuit with the armature terminals of said dynamo and calibrated to read in mechanical power.

2. A power meter, comprising a transmission dynamometer provided with means to connect the same to a shaft the power of which is to be measured, a dynamo electric machine adapted to have the effective magnetic flux through its armature varied, operative connection between a part of said dynamo and said dynamometer to vary said flux directly as the torque of said dynamometer varies, means to vary the speed of rotation of the rotating element of said dynamo directly as the angular velocity of said shaft varies, and a voltage operated measuring instrument connected in circuit with the armature terminals of said dynamo.

3. A power meter, comprising a transmission dynamometer provided with means to connect the same to a shaft the power of which is to be measured, a dynamo electric machine having a constant magnetic field and provided with means whereby the effective magnetic flux through its armature may be varied, operative connection between a part of said dynamo and said dynamometer to vary said flux directly as the torque of said dynamometer varies, means to vary the speed of rotation of the rotating element of said dynamo directly as the angular velocity of said shaft varies, and a voltage operated measuring instrument connected in circuit with the armature terminals of said dynamo.

4. A power meter, comprising a transmission dynamometer, a dynamo electric machine adapted to have the effective magnetic flux through its armature varied, operative connection between a part of said dynamo and said dynamometer, adapted to vary said flux directly as the torque of said dynamometer varies, driving connection between said dynamometer and the rotating element of said dynamo, and a voltage operated measuring instrument connected in circuit with the armature terminals of said dynamo.

5. In apparatus of the character described, the combination with a rotatable shaft, of two interengaging cam clutch members, one fixed on said shaft and the other movable relative thereto both angularly and longitudinally, a spring adapted to hold the cam faces of said members in engagement, but yielding under compression against relative longitudinal movement between said clutch members, transmission gearing connected to that one of said members which is longitudinally movable, a dynamo electric machine operatively connected through said gearing to said longitudinally movable member to have the effective magnetic flux through its armature varied by the movement thereof directly as the torque transmitted by said shaft, means to drive the rotating element of said dynamo at a speed proportional to that of said shaft, and a voltage-operated measuring instrument connected in circuit with the brush terminals of said dynamo.

In testimony whereof I affix my signature in presence of two witnesses.

CHARLES E. VAWTER, Jr.

Witnesses:
L. F. SCHROEDER,
C. S. MAST.